United States Patent
Thunemann

(10) Patent No.: US 8,533,689 B2
(45) Date of Patent: Sep. 10, 2013

(54) METHOD, APPARATUS AND COMPUTER PROGRAM PRODUCT FOR CREATING INTER-LANGUAGE INTERFACE

(75) Inventor: Paul Z. Thunemann, Snoqualmie, WA (US)

(73) Assignee: The Boeing Company, Chicago, IL (US)

( * ) Notice: Subject to any disclaimer, the term of this patent is extended or adjusted under 35 U.S.C. 154(b) by 1279 days.

(21) Appl. No.: 12/249,440

(22) Filed: Oct. 10, 2008

(65) Prior Publication Data

US 2010/0095282 A1 Apr. 15, 2010

(51) Int. Cl.
G06F 9/44 (2006.01)
G06F 9/45 (2006.01)

(52) U.S. Cl.
USPC ........... 717/136; 717/108; 717/113; 717/116; 717/117

(58) Field of Classification Search
None
See application file for complete search history.

(56) References Cited

U.S. PATENT DOCUMENTS

| | | | |
|---|---|---|---|
| 5,446,902 A * | 8/1995 | Islam | 717/116 |
| 5,854,932 A * | 12/1998 | Mariani et al. | 717/116 |
| 6,230,117 B1 * | 5/2001 | Lymer et al. | 703/22 |
| 6,314,429 B1 * | 11/2001 | Simser | 717/163 |
| 6,370,682 B1 * | 4/2002 | Eckardt et al. | 717/141 |
| 6,460,177 B1 * | 10/2002 | Lee | 717/146 |
| 6,513,153 B1 * | 1/2003 | Lee | 717/100 |
| 6,654,950 B1 * | 11/2003 | Barnishan | 717/136 |
| 7,266,811 B2 * | 9/2007 | Mohamed et al. | 717/136 |
| 7,353,502 B2 * | 4/2008 | Stewart et al. | 717/136 |
| 7,406,682 B2 * | 7/2008 | Todd et al. | 717/137 |
| 7,827,530 B2 * | 11/2010 | Iyer | 717/124 |
| 7,856,618 B2 * | 12/2010 | Donovan et al. | 717/107 |
| 8,117,589 B2 * | 2/2012 | Christensen et al. | 717/106 |
| 8,250,528 B2 * | 8/2012 | Meijer et al. | 717/116 |
| 2003/0046669 A1 * | 3/2003 | Mohamed et al. | 717/136 |
| 2004/0006762 A1 * | 1/2004 | Stewart et al. | 717/106 |
| 2004/0034833 A1 * | 2/2004 | Kougiouris et al. | 715/513 |
| 2004/0158820 A1 * | 8/2004 | Moore et al. | 717/136 |
| 2006/0150146 A1 * | 7/2006 | Meijer et al. | 717/108 |
| 2006/0184922 A1 * | 8/2006 | Vera | 717/136 |
| 2007/0220496 A1 * | 9/2007 | Kasama | 717/136 |

(Continued)

OTHER PUBLICATIONS

Beazley et al., Perl Extension Building with SWIG, Presented at the O'Reilly Perl Conference 2.0, Aug. 17-20, 1998, San Jose, California, pp. 1-19.*

(Continued)

*Primary Examiner* — Thuy Dao
*Assistant Examiner* — Zheng Wei
(74) *Attorney, Agent, or Firm* — Alston & Bird LLP

(57) ABSTRACT

An inter-language interface is created for an executable file written in a legacy language. The header associated with the legacy file is initially marked up language to generate a first marked header. The legacy file is then wrapped with a first wrapper based at least partially upon the first marked header to create a first wrapped file. Additionally, the first marked header is associated with type maps customized in accordance with the target language in order to generate a second marked header. An executable file may then be generated by wrapping the first wrapped file with a second wrapper so as to be executable in the target language, thereby creating a second wrapped file. Additionally, an interface layer is generated to associate functions in the legacy language with methods in the target language and to define the usage in the target language of the parameters in the legacy language.

21 Claims, 4 Drawing Sheets

(56) References Cited

U.S. PATENT DOCUMENTS

| | | | |
|---|---|---|---|
| 2007/0240114 A1* | 10/2007 | Dallman | 717/124 |
| 2008/0092114 A1* | 4/2008 | Nakamura et al. | 717/107 |
| 2008/0127123 A1* | 5/2008 | Sattler et al. | 717/136 |
| 2010/0083221 A1* | 4/2010 | Naik et al. | 717/108 |
| 2011/0035725 A9* | 2/2011 | Naik et al. | 717/108 |

OTHER PUBLICATIONS

Jerry Fizpatrick, Case Study: Converting C programs to C++, published in C++ report, Feb. 1996, pp. 1-8.*

David Beazley, Swig Master Class, Presented at PyCon'2008, pp. 1-89.*

David M. Beazley, SWIG: An Easy to Use Tool for Integrating Scripting Languages with C and C++, Presented at the 4th Annual Tcl/Tk Workshop, Monterey, CA. Jul. 6-10, 1996, pp. 1-16.*

Huang et al., Wrapping Legacy Codes for Grid-Based Application, published by IEEE Computer Society, 2003, pp. 1-7.*

Canfora et al., Decomposing Legacy Programs: A First Step Towards Migrating to Client-Server Platforms, published 1998, pp. 1-9.*

Li et al., Wrapping MPI-based legacy codes as Java/CORBA components, published by Future Generation Computer System 2001, pp. 213-223.*

David M. Beazley, Interfacing C/C++ and Pytho with SWIG, publihsed 2008, pp. 1-115.*

*SWIG 1.1 Users Manual*; http://www.swig.org/Doc1/HTML (visited Oct. 10, 2008 and Jun. 16, 2008), Table of Contents, Sections 2 and 5.

* cited by examiner

METHOD, APPARATUS AND COMPUTER PROGRAM PRODUCT FOR CREATING INTER-LANGUAGE INTERFACE

TECHNICAL FIELD

Embodiments of the present invention relate generally to techniques for facilitating the use of executable files written in a legacy language by computer programs written in another language and, more particularly, to methods, apparatus and computer program products for creating an inter-language interface for an executable file written in a legacy language.

BACKGROUND

A number of executable files have been written, debugged and used for a wide variety of purposes. For example, libraries of executable files have been created with the executable files within the library configured to perform different respective functions. As such, a computer program can call or otherwise access various files within the library in order to make use of the respective functions. These executable files have been written in a variety of languages including, for example, Fortran and C. Notwithstanding the wealth of executable files written in various legacy languages, such as Fortran and C, newer programming languages have been developed and are being widely adopted, including, for example, C++ and various scripting languages, such as Java, Python, Jython and Groovy. These newer programming languages offer numerous advantages with some being considered relatively easy to use by programmers and offering more freedom from complex development environments by avoiding the use of compilers, linkers or the like.

It is relatively common for computer programs written in a newer or different language to need to perform the same functions as those performed by existing executable files written in a legacy language. In order to provide those same functions, the existing executable files written in the legacy language may be rewritten in the new language. As will be apparent, this approach is relatively labor intensive and may require significant time and expense to recreate and validate the functions previously performed by the executable files written in the legacy language.

Alternatively, an interface can be written to permit a computer program written in a newer or different language to access and make use of the functions performed by executable files written in a legacy language. Among other things, the interface must identify the name of the legacy function to be accessed and define the parameters, if any, to be provided to the legacy function as well as the manner in which input and output parameters used by the legacy function are to be handled. In light of the relatively voluminous libraries of functions written in C and other legacy languages, it would be desirable for the interface to be generated in as automated of a fashion as possible. As such, interface generation applications, such as the Simplified Wrapper Interface Generator (SWIG), have been developed in order to assist developers in the generation of an interface between a target language, such as a scripting language, and legacy C functions. SWIG generates a wrapper function that converts each argument from the target language data type to the legacy language, confirms their validity, calls the legacy C function and then converts the returned parameters back into parameters recognized by the target language.

However, the code generated by an interface generation application such as by the SWIG including the wrapper functions can be somewhat difficult for developers to use. Thus, a number of developers still hand wrap each of the automatically generated wrapper functions to facilitate use of the wrapper functions in the scripting language. However, the hand wrapping of the automatically generated wrapper functions can result in a substantial amount of effort and time even though the interface itself is automatically generated.

In addition to SWIG, other interface generation applications have been developed in order to convert legacy C files to a specific target language. For example, the Boost interface generation application has been developed to support usage of legacy C files by Python programs and a JNI interface generation application has been developed to support the use of legacy C files by Java programs. As noted, however, each of these interface generation applications is specific to an individual target language, and, as such, a different interface must be generated in order to facilitate use of the same legacy C files by computer programs written in another language.

As such, it would be desirable to provide an improved interface generation application for permitting software programs written in one or more languages to utilize legacy files, such as the various functions of a legacy library. In this regard, it would be desirable to automatically generate such an interface in a manner that reduces the manual work that would be otherwise required in order to utilize the automatically generated interface. Additionally, it would be desirable to provide an automatically generated interface between legacy files and multiple target languages, such as various scripting languages, in order to increase the flexibility provided to the user with respect to the use of the legacy files.

BRIEF SUMMARY

A method, apparatus and computer program product are therefore provided to create an inter-language interface for an executable file written in a legacy language. In accordance with embodiments of the present invention, the inter-language interface is created in a manner that may reduce the manual effort that might otherwise be expended to create the interface, such as by eliminating the hand wrapping required by some prior approaches. In addition, embodiments of the present invention create an inter-language interface that may permit access to the executable files written in the legacy language by software programs written in a variety of target languages.

According to one embodiment, a method is provided for creating an inter-language interface from an executable file written in a legacy language and having an associated header. The method of this embodiment marks the header, such as a C header, to generate a first marked header, such as a C header with mark up. In this regard, the header identifies one or more functions of the executable file as well as one or more parameters of the respective functions. As such, in marking the header, the header is marked to define an exposure of the respective functions in an object-oriented architecture of a target language and to define the usage of the parameters of the respective functions.

The method of this embodiment also wraps the executable file that is written in the legacy language, such as a C source file, with a first wrapper based at least partially upon the first marked header to create a first wrapped file, such as a C++ source file. Additionally, type maps customized in accordance with the target language are associated with the first marked header in order to generate a second marked header, such as a C++ header. An executable file, such as a target language source file, may then be generated by wrapping the first wrapped file with a second wrapper configured to permit execution of the first wrapped file with computer executable instructions in the target language. As such, a second wrapped file is created. Additionally, an interface layer is generated that is configured to associate functions in the legacy language with methods in the target language and to define the usage in the target language of the parameters of the functions in the legacy language. Based upon the resulting interface layer, a computer program written in the target language can readily access the functions provided by an executable file written in the legacy language, such as C or Fortran, without having to rewrite the executable file in the target language and without having to manually write wrappers for the interface layer.

In order to mark the header, a graphical user interface may be presented and user input may be received in order to appropriately correlate aspects of the target language with aspects of the legacy language. In this regard, input may be received to associate the one or more functions of the executable file with respective class types of the target language. Input may be received to name the one or more functions of the executable file in a manner consistent with a naming convention of the target language. Input may be received to identify a type for each parameter of the respective functions with the type being consistent with the target language.

Based upon the first marked header, documentation may also be generated regarding the executable file. In this regard, the documentation may define or otherwise describe the one or more functions of the executable file and the one or more parameters of the respective functions.

As described, a method is provided for creating an inter-language interface to facilitate access and use of an executable file written in a legacy language by a computer program written in a different target language. As such, the inter-language interface may be generated in an automated manner and may facilitate access of the executable file written in the legacy language by software programs written in a variety of different target languages. Thus, the method of embodiments to the present invention facilitate use of legacy files by various target languages without requiring extensive involvement by the developer or other user.

While described above in the context of a method, other embodiments of the present invention include a computer program product or an apparatus for creating an inter-language interface for an executable file written in a legacy language. In this regard, the computer program product includes at least one computer-readable storage medium having computer-executable program code portions stored therein. The computer-executable program code portions include various program code instructions configured to perform the functions described above in the context of the corresponding method. As to the apparatus, the apparatus includes a processor configured to also perform the functions also described above in the context of the corresponding method.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Relatively large collections of executable files written in a legacy language, such as C, Fortran or the like, have been created. These executable files, termed legacy files, perform various functions and are sometimes arranged in libraries that are accessible by computer programs written in the legacy language in order to make use of the functions provided by the respective legacy files. For example, a computer program written in the legacy language may call one legacy file from the library in order to configure the data in an array and another legacy file from the library in order to process the array in a predefined manner.

Figure 1:
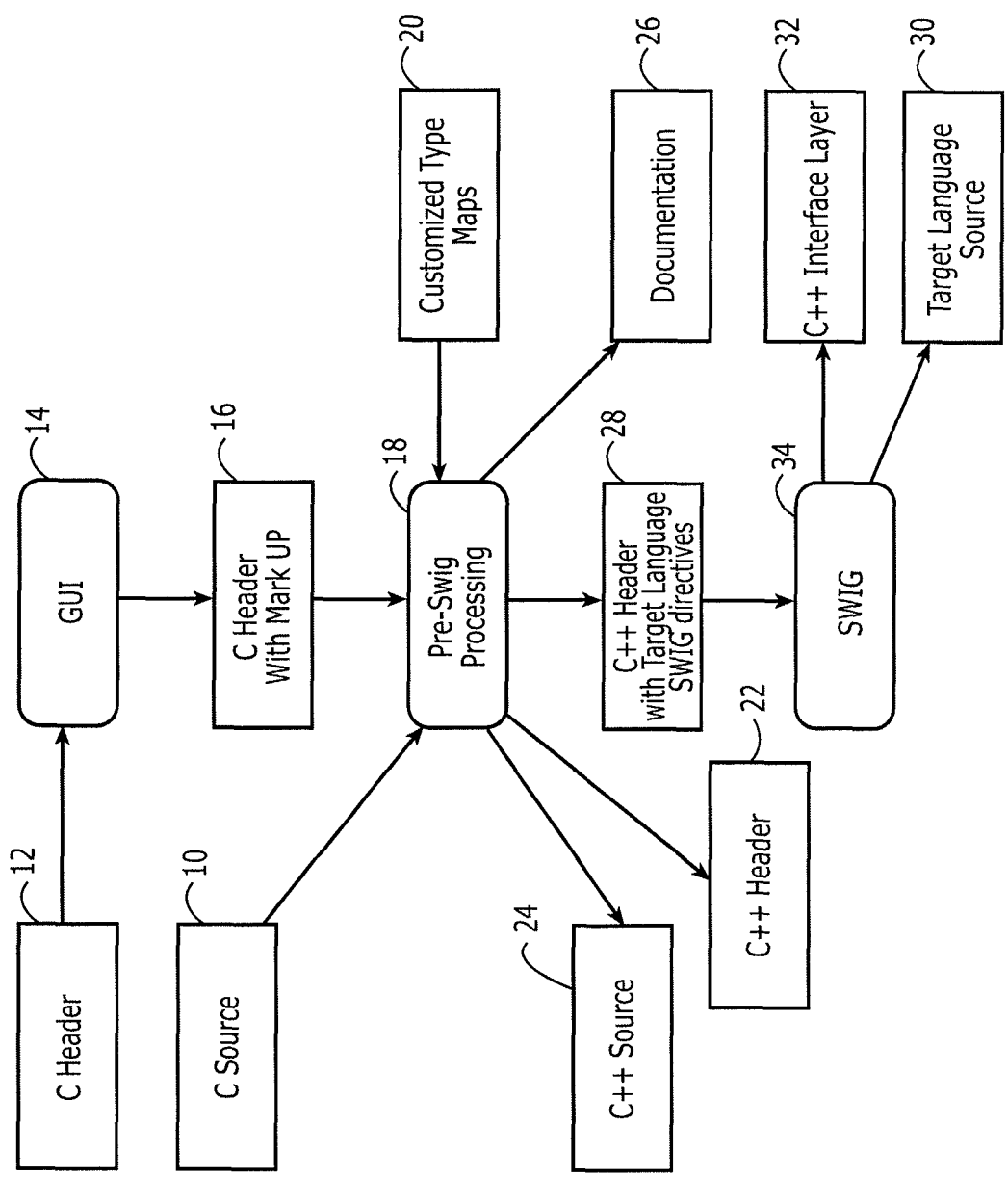
FIG. 1 is a flow chart illustrating the operations performed in accordance with one embodiment to the present invention.

As shown in FIG. 1, each legacy file 10 has an associated header 12 that identifies or names the respective file and identifies the parameters that are input to and output from the respective file. Like the legacy file, the associated header is generally structured and written in a manner that is specific to the legacy language.

In order to create an inter-language interface between legacy files written in the legacy language and computer programs written in one or more target languages, the header of the legacy file is initially marked up so as to generate a first marked header. Although embodiments of the present invention may create an inter-language interface between legacy files written in a variety of legacy languages and computer programs written in a variety of target languages, one embodiment of the present invention will be hereinafter described in conjunction with the creation of an inter-language interface for legacy files written in C, e.g., files comprised of C source code, for access by a computer program written in an object-oriented target language, such as Java. The header(s) 12 of the legacy file(s) 10 therefore identifies one or more of functions of the legacy file and one or more parameters or arguments of the respective functions. As such, in marking the header, the header is marked so as to define (i) the method exposure in the object-oriented architecture of the target language(s) that are to be associated with respective functions in the legacy language, putting each function in one of several classes or, in other words, defining how each factor will fit into the object-oriented architecture, and (ii) the manner in which the parameters of the respective functions are used, e.g., input vs. output, scalar vs. array, etc.

In this regard, by defining how the legacy function is exposed in an object-oriented architecture, each function is placed into one of several classes. This placement is necessary since classes do not exist in C or Fortran, but they do exist in Java, Python, C#, etc. Each class will encapsulate some C language-data. This C-data could be one or more C structure, or for older C-code it could be a "hold" array. Also, by defining the usage of parameters, ambiguity is removed from the C-prototype about each of the parameters. For example, the mark-up may answer at least the following questions: (a) Is it input, output or both? (b) Is it a single value, an array, a rectangular array or arrays or a ragged array or arrays. If it is an array, does the array have internal stride information that allows it to represent multidimensional data? For example, with respect to the C prototype void example(int num, double*arr), there is some ambiguity. In particular, "arr" could be a double value that is input, or it could be a double value that is output, or a double array that was input or a double array that was output (and the memory was already allocated). It may also be a double array that is modified (so it is both input and output). The variable "num" may be related to the variable "arr" in that it may be defining the length of "arr". By marking up the header, this potential ambiguity can be resolved, so that the C function's parameter usage is completely defined. This markup and the corresponding elimination of ambiguity allows for the automation across all target languages.

In one embodiment, the header is marked up to equate the name of a method in the target language with the name of a legacy function, e.g., legacy file, and to define the various parameters as either inputs or outputs and to also define the type and size of the various parameters as well as the manner in which the parameters from the legacy file are to be mapped to the target language. The header of the legacy file is typically marked in accordance with a markup language such that the resulting first marked header can be easily parsed by developers. In this regard, embodiments of the present invention may utilize eXtensible Markup Language (XML) to mark the header of the legacy file. As such, mark-up tags may be utilized to define the methods associated with the respective functions and to define the usage of the parameters of each respective function.

Figure 2:
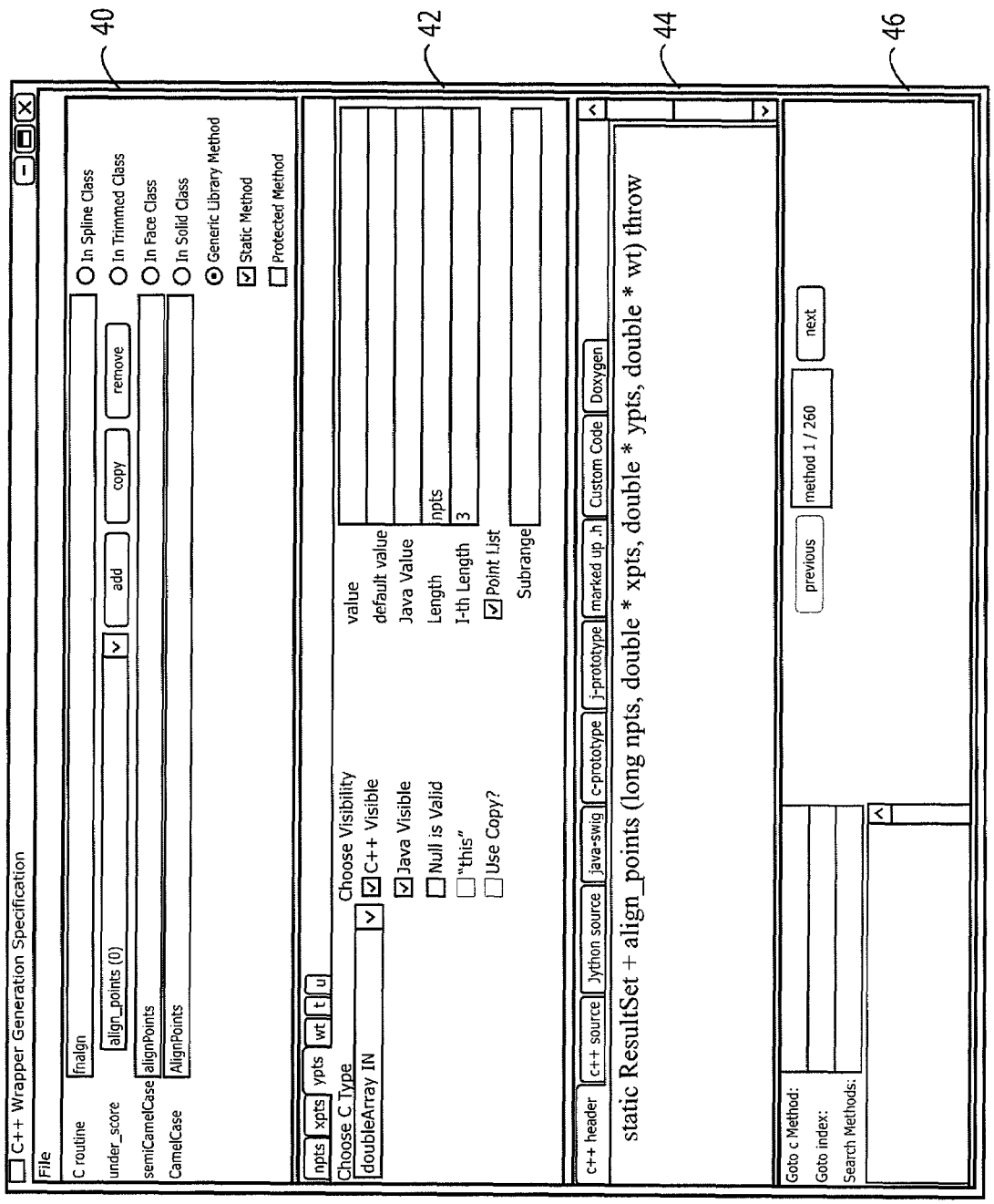
FIG. 2 is a representation of a graphical user interface that is configured to solicit and receive input utilized in order to generate a first marked header in accordance with one embodiment to the present invention.

In one embodiment, user input is solicited in order to appropriately mark the header 12 of the legacy file 10 to create a first marked header 16, termed a C header with mark up in FIG. 1. In this regard, a graphical user interface 14 can be presented, such as via a display, and input can be received, such as via a user interface, to receive the requisite user input required to mark the header. As shown in FIG. 2, for example, the graphical user interface can include a plurality of portions, each portion of the illustrated embodiment depicted in a separate subwindow within the graphical user interface. The upper portion 40 of the graphical user interface of the illustrated embodiment identifies the legacy file by name and then permits the user to enter a name of the respective function in a manner consistent with the naming convention of the target language. Since different target languages have different naming conventions, the graphical user interface can permit the user to name the same function in accordance with several different naming conventions to facilitate access of the legacy function by computer programs written in each of several target languages. For example, the graphical user interface of FIG. 2 permits the legacy function identified as fnalgn to be named in accordance with the under_score, semiCamelCase and CamelCase naming conventions. Additionally, this portion of the graphical user interface permits the user to define the class type and/or the type of method represented by the legacy function. As such, corresponding methods and/or classes of the target language may be associated with the respective function of the legacy file.

The second portion 42 of the graphical user interface of FIG. 2 permits the user to define the usage of the parameters of the respective legacy function. In this regard, for each parameter or argument of the legacy function, e.g., npts, xpts, ypts, wt, t and k, the user is permitted to identify the type of the parameter, such as doubleArray IN indicating a double column array of integers. The user can also select the visibility of the respective parameter in each of the target languages, such as C++, Java or the like. If a parameter is not selected to be visible in a respective target language, the documentation that is generated for that target language shall not include the respective parameter. Furthermore, the method signature in the target language will not contain the hidden parameter. Conversely, if a parameter is indicated to be visible, the documentation for the respective language will include a description of the parameter. This portion of the graphical user interface of the embodiment of FIG. 2 can also permit a user to identify whether a null value is valid or invalid.

Another selectable option presented by the second portion 42 of the graphical user interface is "This". A legacy function may be defined as "static" or "not static". If the legacy function is not static, then it will become a "method" in the target language. In object oriented programming, a method is a function that is associated with a given class. The method generally uses or modifies the data associated with an instance of that class. "This" is defining the parameter in the legacy function that is the data that the object oriented class is wrapping. In addition, a user can identify whether a copy of the original parameter is to be used. In instances in which the user elects to use a copy of the original parameter, the original parameters will not be modified as a result of subsequent processing in the target language.

This second portion 42 of the graphical user interface of the embodiment of FIG. 2 also permits a value and a default value to be assigned to the respective parameter. The "value" is the value that the variable will have in the C++ code. In general, this field is used when the variable is not visible to the target language and it is desired to define some value that should be used in the call to the legacy code. When the default value is defined, it means that the variable is exposed to the target language, but it is an optional argument. When the argument is not included in the calling sequence (by the user calling from the target language), then the default value should be used. With respect to Python, see: http://docs.python.org/ref/function.html. In Java, this technique may be partially mimicked using method overloading.

The user can also define other values associated with the respective parameter including its length and its I-th length. Additionally, a user can define the respective parameter to be a point list. By way of example, in the legacy C code, there may be a set of parameters that define a rectangular array of data, but with the data being stored as a flat list. For example, in conjunction with the function: void myFunction (double*data, int numRows, int numCols), consider the array [1,1,1,2,2,2,3,3,3,4,4,4] with numRows=4 and numCols=3. This array represents a matrix (or, in geometry, it may be regarded as a list of points, hence the term point-list) as follows:

[(1, 1, 1)(2, 2, 2)(3, 3, 3)(4, 4, 4)]

In this example, the length is 4 and the I-th length (or the point-length) is 3.

With respect to the embodiment of the graphical user interface depicted in FIG. 2, the third portion 44 of the graphical user interface can present various other files or documents associated with the respective legacy file for which the header is being marked up. Many of these other files or documents, such as the C++ header are described below and, as such, will not now be described. However, it is noted that the C-prototype and J-prototype tabs permit the display of a legacy file written in the C language and written in Java, respectively. The marked up .h tab permits the display of a markup language code, such as xml codes for the respective function and may be utilized for debugging purposes since the markup language code can generally be readily interpreted.

The graphical user interface of the embodiment depicted in FIG. 2 can also include a fourth portion 46 which permits a user to select a particular function or method in order to enter information or review the user selections that define the first marked header. In the illustrated embodiment, the C function fnalgn is the first of 260 methods.

By way of example, a legacy routine that has been marked up to allow it to be wrapped into a variety of target languages is provided below:

```
long int spbnds (            <Spline>
    DSPLINE *c,                <method cname="spbnds" targetname="limits">
    double **bounds              <Spline name="c" c="IN" cpp="false" this="true" />
                                 <doubleArray name="bounds" c="OUT" len="num_dep( )"
                                      ithLength="2" pointList="true" address="true" />
                             </method>
                             ... other methods ...
                             <Spline>
```

The legacy routine takes a Spline as input and returns the bounding box of that Spline. Within the legacy C code, there is a C-structure called DSPLINE which defines a given Spline with all of its coefficients and knots. However, the C-prototype does not sufficiently define what the method is doing and, as such, XML tags have been added to remove ambiguity and also to define how this function should appear in the target language. The first tag, "Spline", is defining the class where the method being wrapped should be located. The next tag, "method", is stating that a method called "limits" is to be created in our Spline class and that this method will call the legacy routine "spbnds". It is then defined how each of the parameters should be used in this wrapped call. The first argument is a DSpline called "c" that is defined as input at the C level and is indicated that this parameter should be treated as "This" (which is a Java term meaning that it represents the instance of the object from which the method was invoked). The C code returns a double array of output, which is exposed in the target language as a double scripted square array. As a result of this wrapper definition, this method may now be called from Java as:
    double [ ][ ] bounds=mySpline.limits( );
or from Python as:
    [[xmin,xmax],[ymin,ymax],[zmin,zmax]]=mySpline.limits( ).

As illustrated by block 18 of FIG. 1, the first marked header 16 may then be associated with and passed through block 18 with type maps 20 customized in accordance with the target language in order to generate a second marked header 22. A type map is configured to expose a data structure from the legacy code as a different data structure in the target language. The marked up header file completely defines each parameter in a function prototype as belonging to a well defined type (e.g., is it an array or a double?, is it input or output?, etc.) The type map defines how each well defined type should be handled in the target language (e.g., should a C array be treated as a Java array or a Java list?). By separating type maps that define how a particular parameter type behaves from the first marked header that permits users or programmers to define the particular exposure to each target language that they want to see in the application programming interface (API) (e.g., by separating the how from the what), the behavior of a target language API can be changed globally by changing the type maps. Similarly, bugs or other programming errors can be advantageously fixed globally by appropriately fixing a bug in the type maps. An example of a customized type map is the point list. The legacy C code works with a flat array, but it may be desired to expose this array in the target language as an array of arrays. As such, the type map is a section of code written to expose the array in the desired manner. This type map is then used by SWIG to insert the section of code wherever needed. By modifying the first marked header with the type maps, the resulting second marked header more fully defines the legacy file in order to permit a computer program written in a target language to access and use the legacy file. While type maps may be used in conjunction with SWIG, as used herein, type maps are intended to refer to any type of file that is separate from, but used in association with a header file to separate how a parameter type is represented in a target language from the classification of each of the parameters to a given parameter type as described above, regardless of whether the type maps are used in conjunction with SWIG or another interface generator.

Class templates allow any special C++ code to be introduced into the class that does not involve a call to the legacy library. By way of illustration, in the prior example, a function called "num_dep( )" is referenced that has no corresponding method in the legacy C code. Instead, the data would be accessed in the C structure directly. To support an object oriented approach, it was desired to hide the data and allow methods to access that data. For example, the template for the header for the Spline class, may be as follows:

```
class Spline
{
  private:
    Spline( );
    DSPLINE *spline;
  public:
    Spline(DSPLINE *sp);
    Spline(Spline *copy);
    ~Spline( );
/*****************************************************/
// Start of automatically generated Code
// Above this line, you can make edits directly in the file
//       SplineCpp.h.template.txt
/*****************************************************/
//////// AUTOMATION CODE INSERTED HERE DO NOT EDIT
THIS LINE ////////
/*****************************************************/
// End of automatically generated Code
// Below this line, you can make edits directly in the file
//       SplineCpp.h.template.txt
/*****************************************************/
    long int num_dep( );
    long int num_ind( );
};
```

A number of dependent functions, a number of independent functions and some constructors and destructors are defined.

It is also specified that this class is associated with the DSPLINE data structure. A similar template may exist for the source code file, as opposed to the foregoing header file.

One example of a C++ header file 22 is provided below. This C++ header file was generated utilizing the foregoing template that now wraps two (of the many possible) legacy code prototypes, e.g., result set*limits ( ) throw and Spline*extrapolate.

```
class Spline
{
  private:
    Spline( );
    DSPLINE *spline;
  public:
    Spline(DSPLINE *sp);
    Spline(Spline *copy);
    ~Spline( );
/***************************************************************/
// Start of automatically generated Code
// Above this line, you can make edits directly in the file
//         SplineCpp.h.template.txt
/***************************************************************/
//////// AUTOMATION CODE INSERTED HERE DO NOT
EDIT THIS LINE ////////
  ResultSet * limits( ) throw ( ResultSet * );
  Spline* extrapolate(double * bounds, long cont) throw ( ResultSet*);
/***************************************************************/
// End of automatically generated Code
// Below this line, you can make edits directly in the file
//         SplineCpp.h.template.txt
/***************************************************************/
    long int num__dep( );
    long int num__ind( );
};
```

In addition to the C++ header file 22 that is utilized in conjunction with the C++ source file 24 that is discussed below, one or more header files 28 that include target language specific SWIG directives are generated; generally with one header file for each target language. For example, a C++ header file that was generated utilizing the foregoing template and that includes target-language specific SWIG-directives, e.g., Python in this instance, associated with each of the legacy code prototypes follows:

```
class Spline
{
  private:
    Spline( );
    DSPLINE *spline;
  public:
    Spline(DSPLINE *sp);
    Spline(Spline *copy);
    ~Spline( );
/***************************************************************/
// Start of automatically generated Code
// Above this line, you can make edits directly in the file
//         SplineCpp.h.template.txt
/***************************************************************/
//////// AUTOMATION CODE INSERTED HERE DO NOT
EDIT THIS LINE ////////
//*** limits ***//
  %newobject limits;
  %apply ResultSet*POINTLIST{ResultSet * limits};
  %rename(limitSwig) limits;
  %javamethodmodifiers limits "protected";
  %apply double*POINTLIST {double * bounds};
  ResultSet * limits( ) throw ( ResultSet * );
  %clear double * bounds;
//*** extrapolate ***//
  %newobject extrapolate;
  %rename(extrapolateSwig) extrapolate;
  %javamethodmodifiers extrapolate "protected";
  %apply double*POINTLIST {double * bounds};
  Spline* extrapolate(double * bounds, long cont) throw ( ResultSet*);
  %clear double * bounds;
/***************************************************************/
// End of automatically generated Code
// Below this line, you can make edits directly in the file
//         SplineCpp.h.template.txt
/***************************************************************/
    long int num__dep( );
    long int num__ind( );
};
```

In accordance with embodiments of the present invention, the legacy file 10 may be wrapped in a first wrapper based at least partially upon the first header to create a first wrapped file. In the illustrated embodiment, for example, the legacy C file, that is, the legacy C source code, can be wrapped with a first wrapper to create a C++ source file. The C++ source file is the legacy executable file wrapped with a first wrapper that is configured to permit execution of the legacy file by computer programs written in C++. As shown in FIG. 2, the C++ source file can be reviewed by selecting the C++ source tab in the third portion 44 of the graphical user interface. While a C++ source file is created by wrapping the legacy file, other types of source files can be created by wrapping the legacy file, such as the Jython source shown in FIG. 2. In the example depicted in FIG. 1, the second marked header is shown as a C++ header 22. As shown in FIG. 2, selection of the C++ header tab permits the C++ header to be viewed. In addition, the Java-SWIG tab of the illustrated embodiment of the graphical user interface permits the display of a modified version of the C++ header which further includes type definitions customized in accordance with the target language. Further, the custom code tab of the embodiment of the graphical user interface depicted in FIG. 2 permits more detailed customization of the C++ source code, such as by permitting parameters to be exchanged when propagating from one language to another.

In addition to the first wrapped file 24 and the second marked header 22, documentation 26 may be generated based upon the first marked header 16. In this regard, the documentation typically identifies the files, such as by name. For each legacy function, the parameters may also be defined by the documentation, such as in terms of type, value and the like. By referencing the documentation, such as by selecting the Doxygen tab in the graphical user interface of FIG. 2, a developer or other user can develop an appreciation of the various legacy functions and the parameters that are input to, output from or otherwise utilized by the respective functions. As noted above, some parameters of a legacy function that are utilized when the legacy function is executed in the legacy language may not be utilized in the target language and may therefore be hidden and, as a result, not included in the documentation. In this regard, a parameter can be indicated to be visible or, conversely, hidden based upon user input via a graphical user interface or otherwise. For example, the parameter that defines the length of an array may be utilized in a C legacy file, but is not necessary and is therefore hidden in performing the same function in Java such that the parameter is not included in the method signature or in the documentation.

Based upon the second marked header 28, such as the C++ header with target language specific SWIG directives in FIG. 1, a second wrapped file 30 executable in the target language and an interface layer 32 configured to facilitate execution of the second wrapped file in the target language may be generated. In this regard, the second marked header 28 may be provided to a SWIG 34. Based thereupon, an executable file is generated by wrapping the first wrapped file with a second wrapper configured to permit execution of the first wrapped file with computer executable instructions in the target language, such as an object oriented programming language, e.g., Java. This executable file may be considered a second wrapped file and is depicted in FIG. 1 as the target language source code. In addition, the SWIG also generates an interface layer, referenced as a C++ interface layer in the example depicted in FIG. 1, configured to associate functions in the legacy language with methods in the target language and to define the usage of the parameters of the functions in the legacy language in the target language. While the example described above generates a second wrapped file for execution by a single target language, the SWIG can generate a plurality of second wrapped files and associated interface layers for a plurality of different target languages, thereby increasing the versatility of embodiments of the present invention. In addition, while SWIG is described herein as one example of a suitable interface generator, other embodiments may include other types of interface generators, if so desired.

Figure 3:
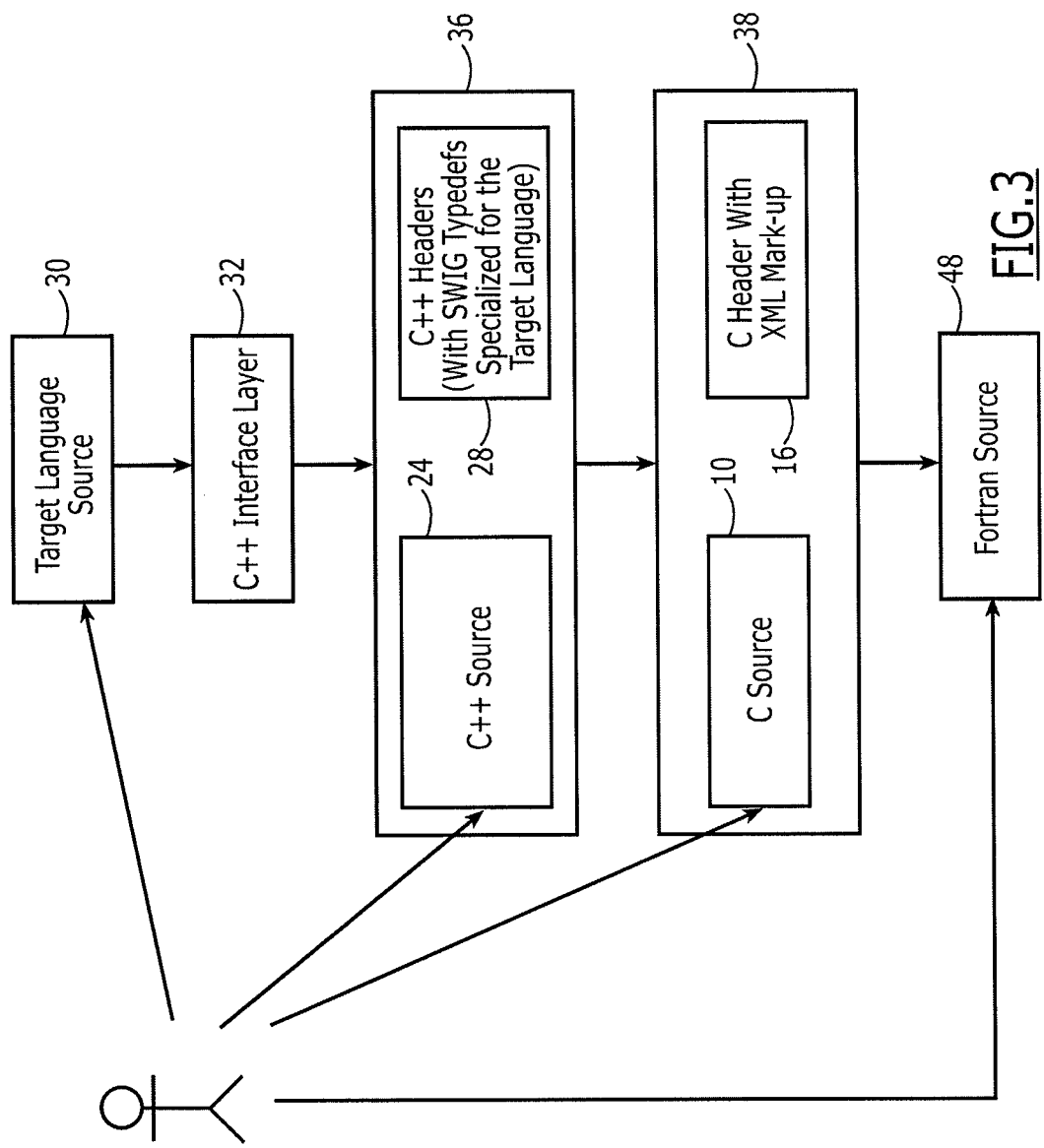
FIG. 3 is a flow chart illustrating the relationship of various source files and associated headers in accordance with one embodiment of the present invention.

Each header file can be compiled with its respective source file into its own library to create a combined binary executable that is linked to the next level. For example, the C++ source 24 and the C++ header 22 or 28 can be compiled into a library 36 that is linked to a library 38 containing a compilation of the C-source 10 and the C-header 16 with mark up. A computer program written in a target language, such as Java, can therefore make use of the functions provided by the legacy files by executing the target language source code 30. As shown in FIG. 3, upon execution of the target language source code, the interface layer 32 will establish communications with the library containing the first wrapped file 24, such as a C++ source code file, and second marked header 22, e.g., the C++ header 22 or 28, with the interface layer providing appropriate associations between the functions and methods of the target language source code and the C++ source code as well as defining the usage of the parameters employed by the respective functions. Based upon the first wrapped file 24 and the second marked header 22 or 28, the library containing the original executable file 10 written in the legacy language, such as the C source code, and the first marked header 16, e.g., the C-header with mark up, may be called with the associations between the functions and methods of the respective files and the usage of the parameters of the respective functions being defined by the first wrapped file 24 and second marked header 22 or 28. As such, a code written in the target language can effectively call back and execute functions in the legacy language, e.g., Fortran per the Fortran source file 48, without having to rewrite the functions in each target language. The results of the function may then be passed from the legacy language to the target language by the aforementioned process of linking from one library to another, albeit in the opposite direction. As also indicated by the arrows between the user and the various libraries and source files, a user may write code to interface with any of the source files including those in the intermediate libraries.

Figure 4:
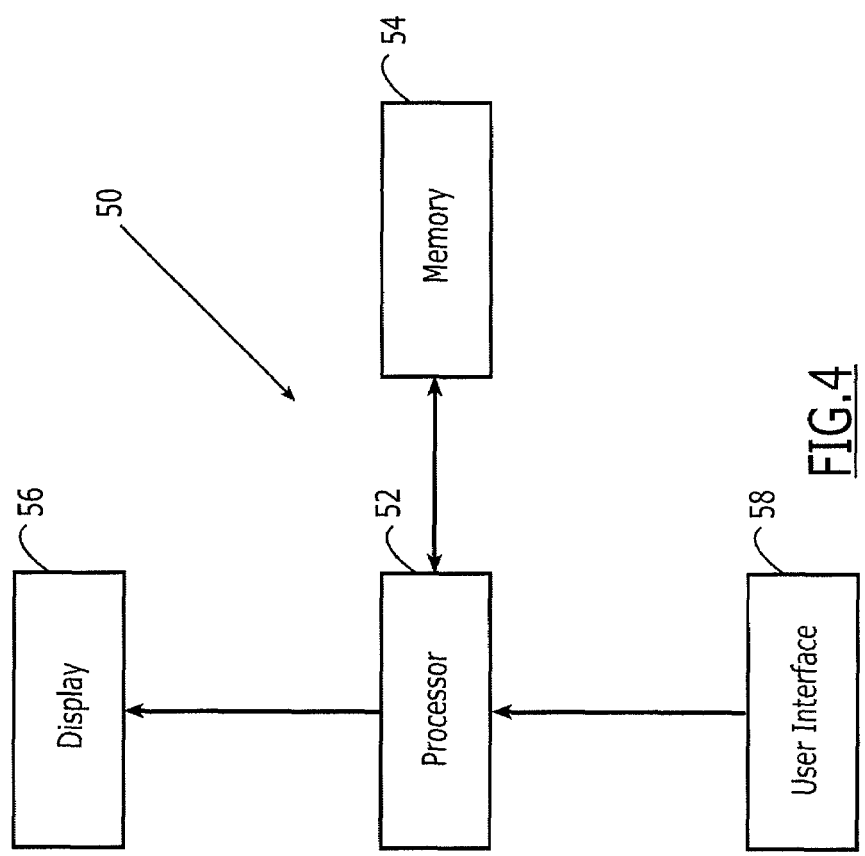
FIG. 4 is a block diagram of an apparatus in accordance with one embodiment of the present invention

As shown in FIG. 4, the apparatus 50 of embodiments of the present invention is typically embodied by a processor 52 and an associated memory device 54, both of which are commonly comprised by a computer or the like. In this regard, the method of embodiments of the present invention as set forth generally in FIG. 1 can be performed by the processor executing a computer program instructions stored by the memory device. The memory device may also store the data in some embodiments. The processor 50 may be embodied in a number of different ways. For example, the processor 50 may be embodied as various processing means such as a processing element, a coprocessor, a controller or various other processing devices including integrated circuits such as, for example, an ASIC (application specific integrated circuit). The memory device 54 may include, for example, volatile and/or non-volatile memory. The computer can include a display 56 for presenting the graphical user interface of FIG. 2 and any other information relative to performing embodiments of the method of the present invention. Additionally, the computer can include a user interface 58 for receiving input from a user. As such, the user interface 52 may include, for example, a keyboard, a mouse, a joystick, a touch screen display, a conventional display, a microphone, a speaker, or other input/output mechanisms.

The apparatus 50 may operate under control of a computer program product according to another aspect of the present invention. The computer program product for performing the methods of embodiments of the present invention includes a computer-readable storage medium, such as the non-volatile storage medium, e.g., memory device 54, and computer-readable program code portions, such as a series of computer instructions, embodied in the computer-readable storage medium.

In this regard, FIG. 1 depicts the operations performed by the methods, apparatus and program products according to exemplary embodiments of the present invention. It will be understood that each operation can be implemented by computer program instructions. These computer program instructions may be loaded onto a computer or other programmable apparatus, e.g., processor 52, to produce a machine, such that the instructions which execute on the computer or other programmable apparatus create means for implementing the operations illustrated in FIG. 1. These computer program instructions may also be stored in a computer-readable memory that can direct a computer or other programmable apparatus to function in a particular manner, such that the instructions stored in the computer-readable memory produce an article of manufacture including instruction means which implement the operations illustrated in FIG. 1. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the operations illustrated in FIG. 1. It will also be understood that the operations illustrated in FIG. 1 can be implemented by special purpose hardware-based computer systems which perform the operations, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A processor-implemented method for creating an inter-language interface for an executable file written in a legacy language and having an associated header, the method comprising:

marking the header to generate a first marked header, wherein the header identifies one or more functions of the executable file and one or more parameters of the respective functions, and wherein marking the header comprises marking the header to define an exposure of the respective functions in an object-oriented architecture of a target language by placing each function in one of several classes and to define usage of the parameters of the respective functions;

wrapping the executable file in the legacy language with a first wrapper based at least partially upon the first marked header to create a first wrapped file;

associating type maps customized in accordance with the target language with the first marked header in order to generate a second marked header having target language specific directives; and generating an executable file based upon the second marked header by wrapping the first wrapped file with a second wrapper configured to permit execution of the first wrapped file with computer executable instructions in the target language to create a second wrapped file and also generating an interface layer configured to associate functions in the legacy language with methods in the target language and to define the usage of the parameters of the functions in the legacy language in the target language.

2. The method according to claim 1 wherein marking the header further comprises presenting a graphical user interface and receiving input to associate the one or more functions of the executable file with respective class types of the target language.

3. The method according to claim 1 wherein marking the header further comprises presenting a graphical user interface and receiving input to name the one or more functions of the executable file in a manner consistent with a naming convention of the target language.

4. The method according to claim 1 wherein marking the header further comprises presenting a graphical user interface and receiving input to identify a type for each parameter of the respective functions with the type being consistent with the target language.

5. The method according to claim 1 further comprising generating, based upon the first marked header, documentation regarding the executable file including the one or more functions of the executable file and the one or more parameters of the respective functions.

6. The method according to claim 1 wherein marking the header to define the exposure of the respective functions comprises placing a function in a respective class.

7. A computer program product for creating an inter-language interface for an executable file written in a legacy language and having an associated header, the computer program product comprising at least one computer-readable storage memory having computer-executable program code portions stored therein, the computer-executable program code instructions comprising:

first program code instructions configured to mark the header to generate a first marked header, wherein the header identifies one or more functions of the executable file and one or more parameters of the respective functions, and wherein the first program code instructions are configured to mark the header by marking the header to define an exposure of the respective functions in an object-oriented architecture of a target language by placing each function in one of several classes and to define usage of the parameters of the respective functions;

second program code instructions configured to wrap the executable file in the legacy language with a first wrapper based at least partially upon the first marked header to create a first wrapped file;

third program code instructions configured to associated type maps customized in accordance with the target language with the first marked header in order to generate a second marked header having target language specific directives; and fourth program code instructions configured to generate an executable file based upon the second marked header by wrapping the first wrapped file with a second wrapper configured to permit execution of the first wrapped file with computer executable instructions in the target language to create a second wrapped file and also to generate an interface layer configured to associate functions in the legacy language with methods in the target language and to define the usage of the parameters of the functions in the legacy language in the target language.

8. The computer program product according to claim 7 wherein the first program code instructions are also configured to mark the header by presenting a graphical user interface and receiving input to associate the one or more functions of the executable file with respective class types of the target language.

9. The computer program product according to claim 7 wherein the first program code instructions are also configured to mark the header by presenting a graphical user interface and receiving input to name the one or more functions of the executable file in a manner consistent with a naming convention of the target language.

10. The computer program product according to claim 7 wherein the first program code instructions are also configured to mark the header by presenting a graphical user interface and receiving input to identify a type for each parameter of the respective functions with the type being consistent with the target language.

11. The computer program product according to claim 7 further comprising fifth program code instructions configured to generate, based upon the first marked header, documentation regarding the executable file including the one or more functions of the executable file and the one or more parameters of the respective functions.

12. The computer program product according to claim 7 further comprising fifth program code instructions configured to mark the header to define the exposure of the respective functions by placing a function in a respective class.

13. A apparatus for creating an inter-language interface for an executable file written in a legacy language and having an associated header, the apparatus comprising:

a processor configured to mark the header to generate a first marked header, wherein the header identifies one or more functions of the executable file and one or more parameters of the respective functions, and wherein the processor is configured to mark the header to define an exposure of the respective functions in an object-oriented architecture of a target language by placing each function in one of several classes and to define usage of the parameters of the respective functions, wherein the processor is also configured to wrap the executable file in the legacy language with a first wrapper based at least partially upon the first marked header to create a first wrapped file, wherein the processor is also configured to associate type maps customized in accordance with the target language with the first marked header in order to generate a second marked header having target language specific directives, and wherein the processor is further configured to generate an executable file based upon the second marked header by wrapping the first wrapped file with a second wrapper configured to permit execution of the first wrapped file with computer executable instructions in the target language to create a second wrapped file and also to generate an interface layer configured to associate functions in the legacy language with methods in the target language and to define the usage of the parameters of the functions in the legacy language in the target language.

14. The apparatus according to claim 13 wherein the processor is configured to mark the header by presenting a graphical user interface and receiving input to associate the one or more functions of the executable file with respective class types of the target language.

15. The apparatus according to claim 13 wherein the processor is configured to mark the header by presenting a graphical user interface and receiving input to name the one or more functions of the executable file in a manner consistent with a naming convention of the target language.

16. The apparatus according to claim 13 wherein the processor is configured to mark the header by presenting a graphical user interface and receiving input to identify a type for each parameter of the respective functions with the type being consistent with the target language.

17. The apparatus according to claim 13 wherein the processor is further configured to generate, based upon the first marked header, documentation regarding the executable file including the one or more functions of the executable file and the one or more parameters of the respective functions.

18. The apparatus according to claim 13 wherein the processor is further configured to mark the header to define the exposure of the respective functions by placing a function in a respective class.

19. The method according to claim 1 wherein marking the header further comprises presenting a graphical user interface and receiving input to define at least one of the usage of at least one parameter of a respective function or a value of at least one parameter of a respective function.

20. The computer program product according to claim 7 wherein the first program code instructions are also configured to mark the header by presenting a graphical user interface and receiving input to define at least one of the usage of at least one parameter of a respective function or a value of at least one parameter of a respective function.

21. The apparatus according to claim 13 wherein the processor is configured to mark the header by presenting a graphical user interface and receiving input to define at least one of the usage of at least one parameter of a respective function or a value of at least one parameter of a respective function.

* * * * *